(12) United States Patent
Gorey et al.

(10) Patent No.: US 9,351,207 B2
(45) Date of Patent: May 24, 2016

(54) SYSTEM AND METHOD FOR PROVIDING SMALL CELL GATEWAY REDUNDANCY IN A NETWORK ENVIRONMENT

(71) Applicant: CISCO TECHNOLOGY, INC., San Jose, CA (US)

(72) Inventors: Kevin L. Gorey, Reading (GB); Mark Grayson, Maidenhead (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/319,614

(22) Filed: Jun. 30, 2014

(65) Prior Publication Data

US 2015/0382259 A1    Dec. 31, 2015

(51) Int. Cl.
*H04W 36/00* (2009.01)
*H04W 36/04* (2009.01)

(52) U.S. Cl.
CPC ..................... *H04W 36/04* (2013.01)

(58) Field of Classification Search
CPC .................................................. H04W 36/00
USPC ................................................. 455/436–444
See application file for complete search history.

(56) References Cited

U.S. PATENT DOCUMENTS

| | | | |
|---|---|---|---|
| 8,687,556 B2 | 4/2014 | Eipe et al. | |
| 9,173,155 B2 | 10/2015 | Kamalaraj et al. | |
| 2010/0075698 A1* | 3/2010 | Rune | H04W 68/08 455/458 |
| 2011/0158171 A1* | 6/2011 | Centonza | H04L 12/2856 370/328 |
| 2011/0171979 A1* | 7/2011 | Rune | H04W 24/02 455/458 |
| 2012/0023360 A1 | 1/2012 | Chang et al. | |
| 2012/0057496 A1* | 3/2012 | Jin | H04W 68/00 370/252 |
| 2013/0163424 A1 | 6/2013 | Goerke et al. | |

FOREIGN PATENT DOCUMENTS

WO    2013/009892    1/2013

OTHER PUBLICATIONS

"TR-069 CPE WAN Management Protocol, Issue: 1 Amendment 5, Issue Date: Nov. 2013, CWMP Version 1.4," Broadband Forum Technical Report, Nov. 2013, © The Broadband Forum. All Rights Reserved; 228 pages.
"TR-196 Femto Access Point Service Data Model, Issue: 2, Issue Date: Nov. 2011," Broadband Forum Technical Report, © The Broadband Forum. All Rights Reserved; 46 pages.
(Continued)

*Primary Examiner* — Charles Shedrick
(74) *Attorney, Agent, or Firm* — Patent Capital Group

(57) ABSTRACT

An example method is provided in one example embodiment and may include configuring a Home eNode B (HeNB) with plurality of tracking area identities (TAIs), wherein each TAI is served by one of a plurality of HeNB gateways (HeNB-GWs); configuring a TAI list for a Mobility Management Entity (MME), wherein the TAI list includes each of the plurality of TAIs; broadcasting a first TAI by the HeNB, wherein the first TAI is served by a first HeNB-GW; and switching the broadcasting from the first TAI to a second TAI served by a second HeNB-GW and re-parenting the HeNB from the first HeNB-GW to the second HeNB-GW if the HeNB loses connectivity with the first HeNB-GW.

16 Claims, 10 Drawing Sheets

(56) References Cited

OTHER PUBLICATIONS

"ETSI-TS-124-301 V9.4.0 (Oct. 2010) Technical Specification: Universal Mobile Telecommunications System (UMTS); LTE; Non-Access-Stratum (NAS) protocol for Evolved Packet System (EPS); Stage 3 (3GPP TS 24.301 version 9.40 Release 9)," ETSI $3^{rd}$ Generation Partnership Project, European Telecommunications Standards Institute, Oct. 2010, Section 5.5.3.2.4, pp. 96-98.

"ETSI-TS-136-300 V11.9.0 (Mar. 2014) Technical Specification: LTE; Evolved Universal Terrestrial Radio Access (E-UTRA) and Evolved Universal Terrestrial Radio Access Network E-UTRAN); Overall description; Stage 2 (3GPP TS 36.300 version 11.9.0 Release 11)," ETSI $3^{rd}$ Generation Partnership Project, European Telecommunications Standards Institute, Mar. 2014, Section 7-10, pp. 56-95).

"3GPP TS 36.413 V13.0.0 (Jun. 2015) Technical Specification Group Radio Access Network; Evolved Universal Terrestrial Radio Access Network (E-UTRAN); S1 Application Protocol (S1AP) (Release 13)," $3^{rd}$ Generation Partnership Project, European Telecommunications Standards Institute, Jun. 2015, 302 pages.

"Scalable Offloading and Security for 3G/LTE Small Cell Networks," Communications Technologies, Hong Kong Applied Science and Technology Research Institute Company Limited, Aug. 11, 2015, 2 pages.

"3GPP TS 36.300 V13.0.0 (Jun. 2015) Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," $3^{rd}$ Generation Partnership Project, European Telecommunications Standards Institute, Jun. 2015, 254 pages.

* cited by examiner

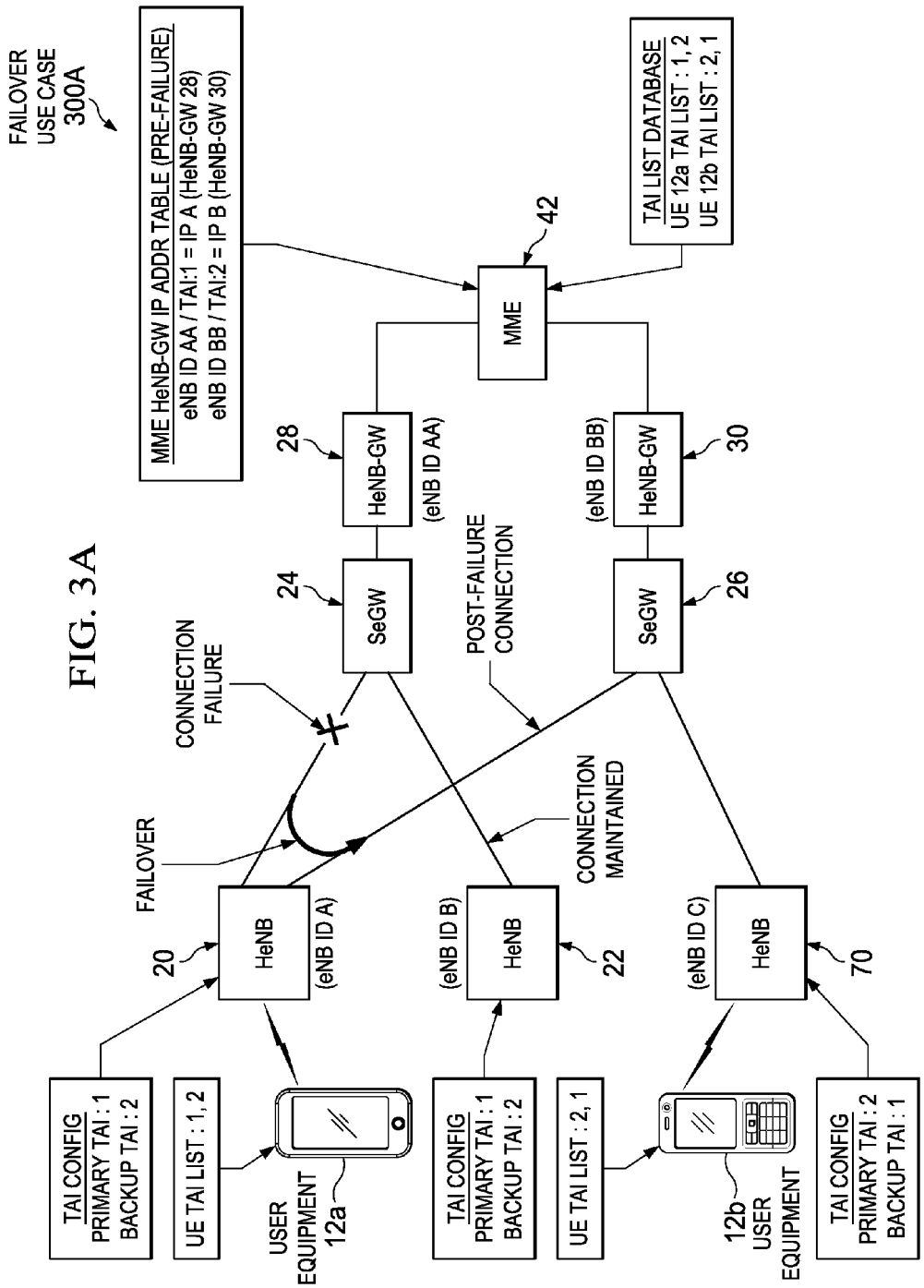

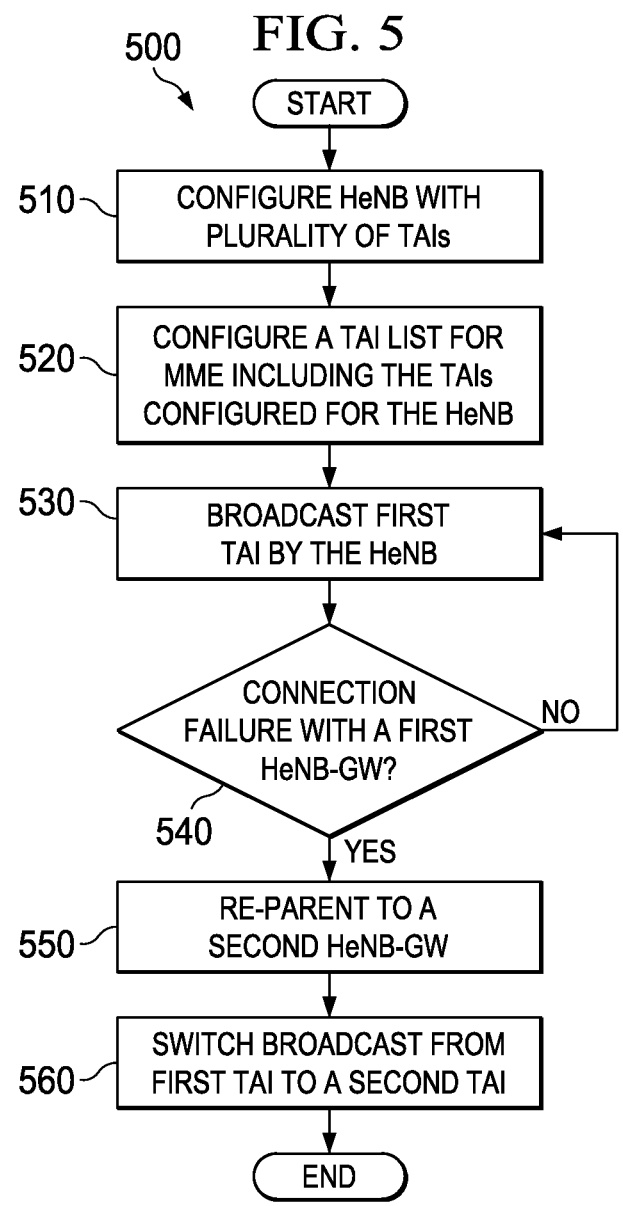

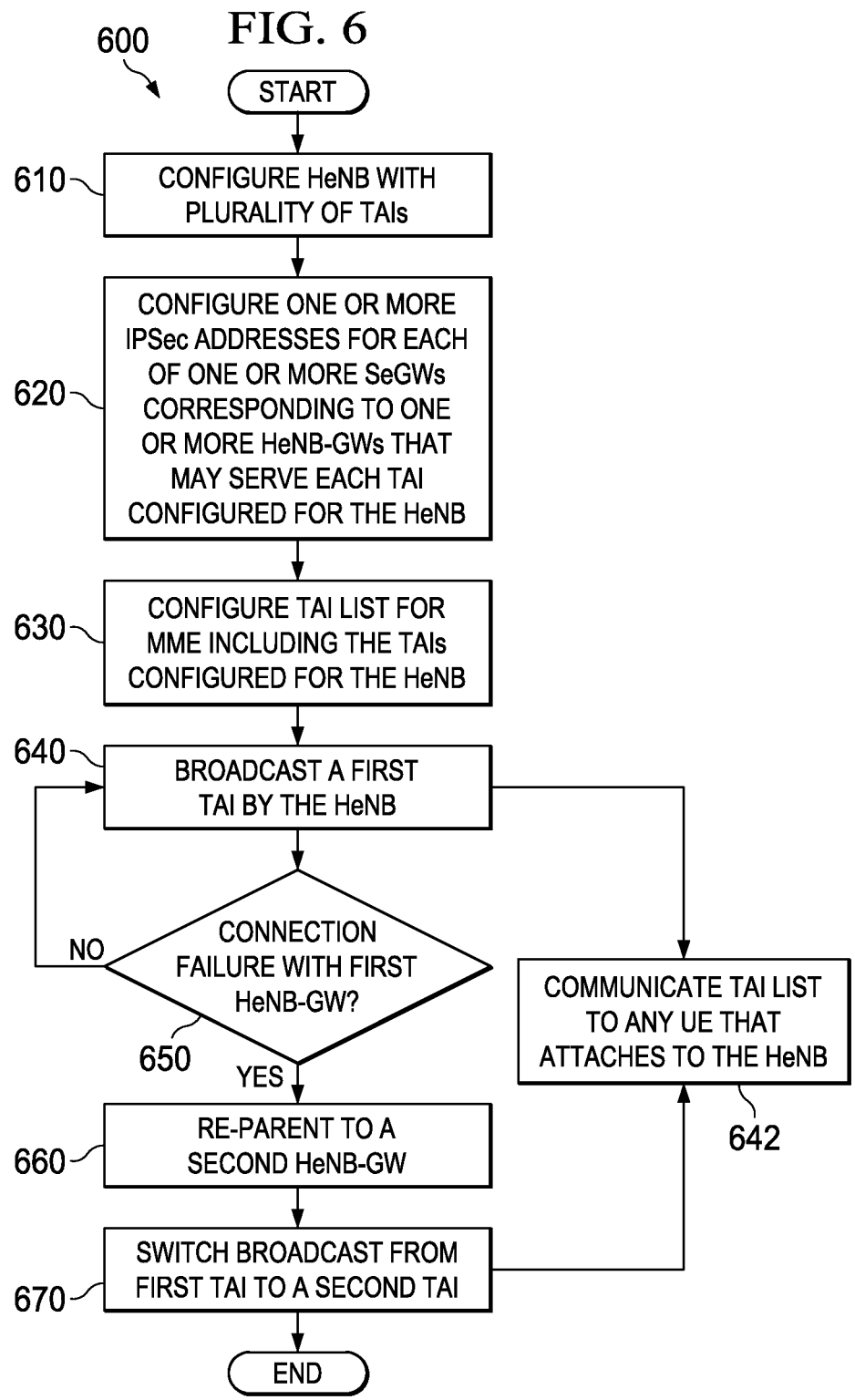

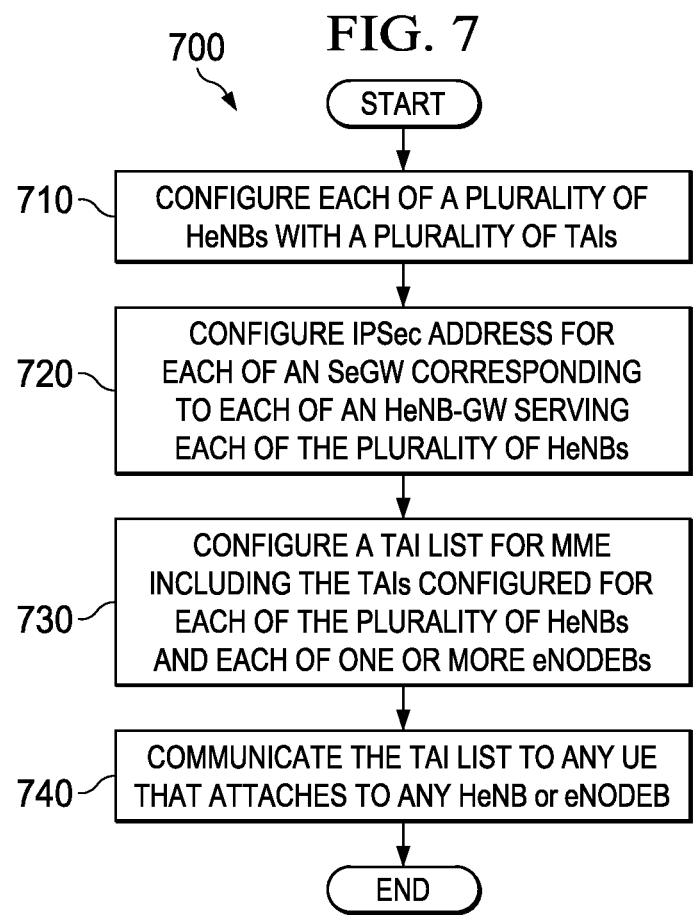

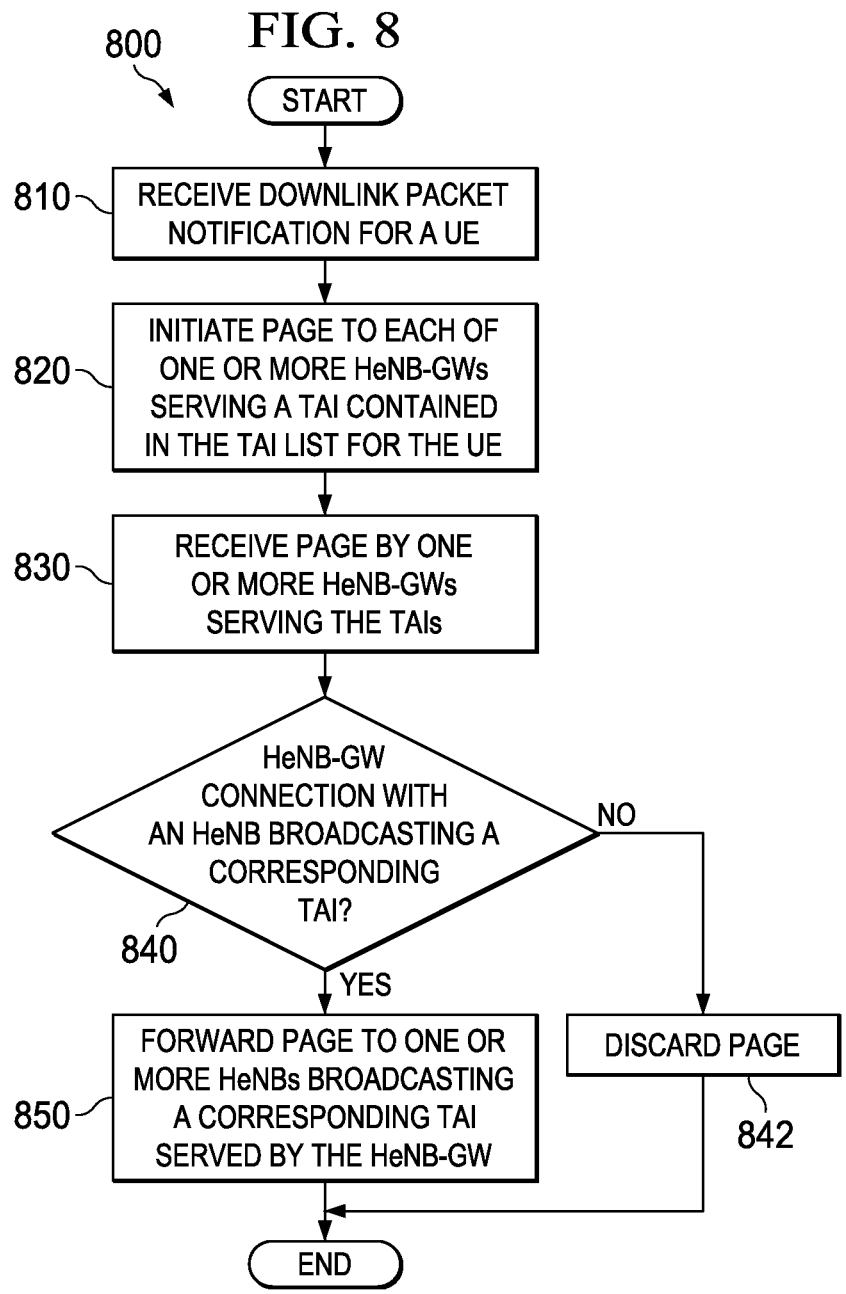

SYSTEM AND METHOD FOR PROVIDING SMALL CELL GATEWAY REDUNDANCY IN A NETWORK ENVIRONMENT

TECHNICAL FIELD

This disclosure relates in general to the field of communications and, more particularly, to a system and method for providing small cell gateway redundancy in a network environment.

BACKGROUND

Networking architectures have grown increasingly complex in communication environments. For example, small cells have gained notoriety due to their capabilities to connect wireless devices to a network. In general terms, small cell radio access points, such as Home eNode Bs (HeNBs), can operate in a licensed spectrum to connect user equipment to the network, often using broadband connections. For a mobile operator, small cell radio access points can offer improvements to both coverage and capacity, which is particularly applicable to indoor networking environments where macro cell networks typically suffer coverage limitations. Small cell radio access points can also offer an alternative networking architecture to enable scalability challenges to be addressed. In particular, there are significant challenges in managing ambiguity and signaling traffic in cases of small cell gateway failures for networks having redundant small cell gateway configurations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A is a simplified block diagram illustrating details associated with one example use case in a particular implementation of the communication system;

FIG. 5-7 are a simplified flow diagrams illustrating example operations associated with providing small cell gateway redundancy in a network environment in various potential embodiments of the communication system; and FIG. 8 is a simplified flow diagram illustrating example operations associated with idle mode paging in one potential embodiment of the communication system.

DETAILED DESCRIPTION OF EXAMPLE EMBODIMENTS

Overview

A method is provided in one example embodiment and may include configuring a Home eNode B (HeNB) with plurality of tracking area identities (TAIs), wherein each TAI is served by one of a plurality of HeNB gateways (HeNB-GWs); configuring a TAI list for a Mobility Management Entity (MME), wherein the TAI list includes each of the plurality of TAI; broadcasting a first TAI by the HeNB, wherein the first TAI is served by a first HeNB-GW; and switching the broadcasting from the first TAI to a second TAI served by a second HeNB-GW and re-parenting the HeNB from the first HeNB-GW to the second HeNB-GW if the HeNB loses connectivity with the first HeNB-GW.

In one instance, the method may include configuring an Internet Protocol Security (IPSec) address for each of a security gateway (SeGW) corresponding to each of the plurality of HeNB-GWs, wherein each TAI configured for the HeNB is associated with a particular IPSec address for a particular SeGW and corresponding HeNB-GW. In another instance, the method may include communicating the TAI list to a user equipment (UE) when the UE attaches to the HeNB. In yet another instance, the method can include configuring the TAI list to include one or more TAIs for one or more corresponding eNode Bs (eNBs); and communicating the TAI list including the plurality of TAIs for the HeNB and the one or more eNBs to a user equipment (UE) when the UE attaches to a particular eNB.

In some cases, the method can include configuring each of a plurality of HeNBs with a plurality of TAIs, wherein each TAI is served by each of the plurality of HeNB-GWs; and configuring the TAI list to include each of the plurality of TAIs configured for each of the plurality of HeNBs. In some instances, the method may further include communicating the TAI list to a user equipment (UE) when the UE attaches to a particular HeNB. In yet other instances, receiving, by the MME, a downlink packet notification for the UE; and routing a page for the UE to each HeNB-GW serving each TAI included in the TAI list. In still other instances, the method can include discarding the page by a particular HeNB-GW if the particular HeNB-GW is not connected to a HeNB broadcasting a TAI included in the TAI list.

In yet other cases, the method can include switching the broadcasting from the second TAI to a third TAI served by a third HeNB-GW and re-parenting the HeNB from the second HeNB-GW to the third HeNB-GW if the HeNB loses connectivity with the second HeNB-GW.

Example Embodiments

Figure 1:
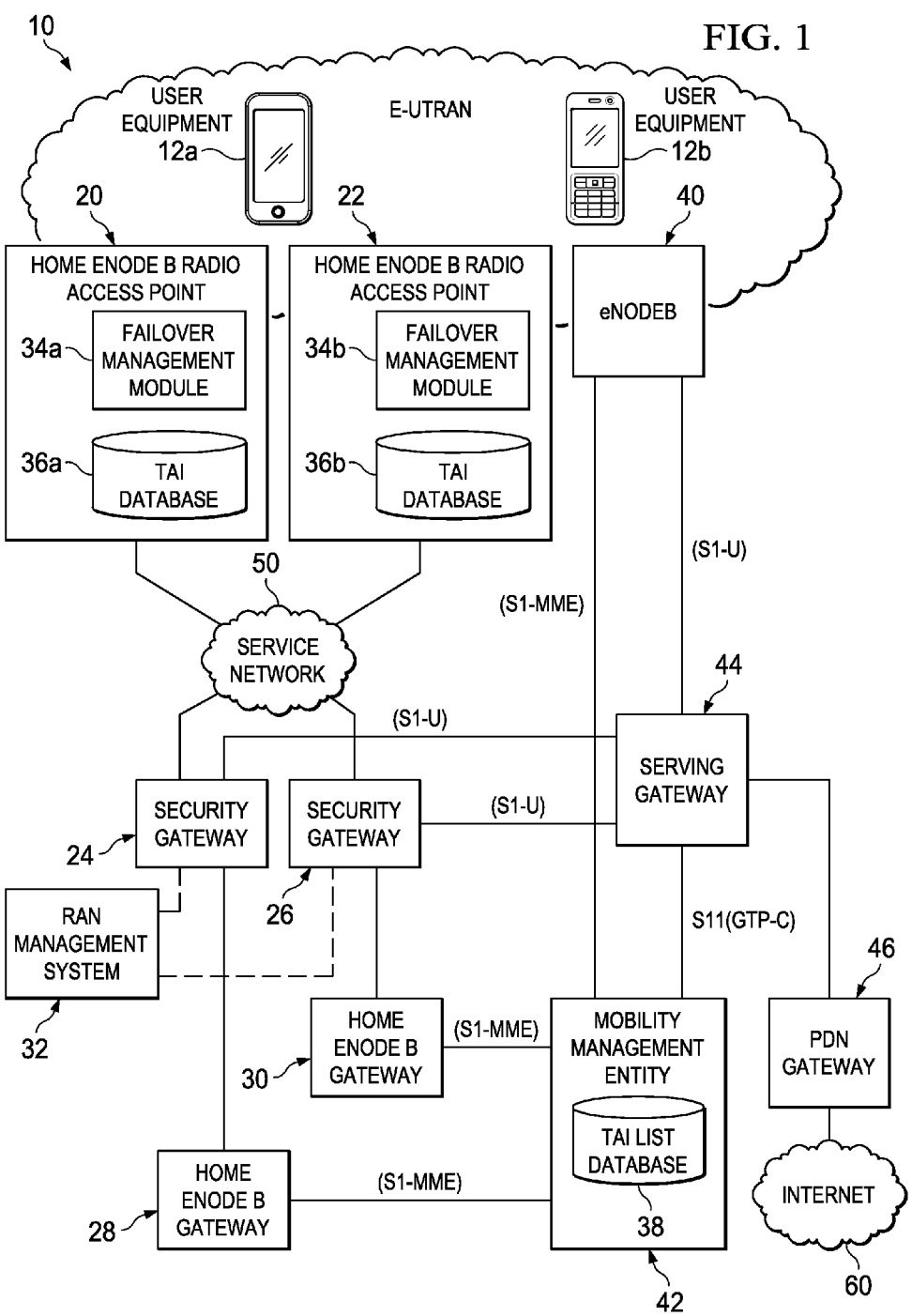
FIG. 1 is a simplified block diagram illustrating a communication system to facilitate providing small cell gateway redundancy in a network environment according to one embodiment of the present disclosure.

Turning to FIG. 1, FIG. 1 is a simplified block diagram illustrating a communication system 10 to facilitate providing small cell gateway redundancy in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 may include user equipment (UE) 12a, 12b, Home eNode B (HeNB) radio access points 20, 22, security gateways (SeGWs) 24, 26, HeNB gateways (HeNB-GWs) 28, 30, a Radio Access Network (RAN) Management System (RMS) 32, an eNodeB (eNB) 40, a Mobility Management Entity (MME) 42, a serving gateway (SGW) 44, a Packet Data Network (PDN) gateway (PGW) 46, a service network 50 and an internet 60. HeNBs 20, 22 may each respectively include a failover management module 34a-34b and a tracking area identity (TAI) database 36a-36b. MME 42 may include a TAI list database. As referred to herein in this Specification, a 'HeNB radio access point' may be referred to interchangeably as a 'HeNB access point', 'HeNB', 'small cell radio access point', 'small cell access point', 'small cell', 'femtocell' or 'femto'. HeNBs 20, 22; SeGWs 24, 26 and HeNB-GWs 28, 30 may be configured according to technical report 069 (TR-069) protocol using the TR-196 version 2 (TR-196v2) data model through an Auto Configuration Service (ACS) provided via RMS 32. It should be understood that any number of HeNBs and/or HeNB-GWs may be deployed in communication system 10.

Each of the elements of FIG. 1 may couple to one another through simple interfaces (as illustrated) or through any other suitable connection (wired or wireless), which provides a viable pathway for network communications. HeNBs 20, 22 may interface with SeGWs 24, 26, HeNB-GWs 28, 30 and RMS 32 via service network 50. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs. In various embodiments, internet 60 may overlap with or include service network 50. In one embodiment, HeNB-GWs 28, 30 and SeGWs 24, 26 may be responsible for handling both control and data plane traffic for UE 12a-12b. In yet another embodiment, HeNB-GWs 28, 30 may be responsible for handling control plane traffic for UE 12a-12b and SeGWs 24, 26 may be responsible for handling data plane traffic for UE 12a-12b.

In various instances, communication system 10 may include LTE access networks such as evolved UTRAN (E-UTRAN), generally referred to as 4G or LTE. In other instances, communication system 10 may include other access networks such as GSM EDGE radio access network (GERAN), UMTS terrestrial radio access network (UTRAN), generally referred to as 3G, which can be provided using one or more NodeB/Radio Network Controllers (NodeB/RNCs), Home Node B's (HNBs), HNB gateways, Mobile Switching Centers (MSCs), serving General Packet Radio Service (GPRS) support nodes (SGSNs), and gateway GPRS support nodes (GGSNs). In various instances, communication system 10 may include other network elements, gateways, etc. to provide cellular mobile coverage for UE within the system, including, but not limited to one or more Mobile Switching Centers (MSCs), a Home Subscriber Server/Home Location Register (HSS/HLR), one or more Policy and Charging Rules Functions (PCRFs) and/or one or more Authentication, Authorization and Accounting (AAA) elements. These elements are not shown in order to highlight other features of communication system 10.

An Evolved Packet Core (EPC) for a 3GPP EPS architecture typically includes an HSS/HLR, one or more MMEs, one or more SGWs, one or more PGWs, one or more serving gateway support nodes (SGSNs), an AAA element and/or a policy and charging rules function (PCRF). These elements may be provided in the service provider network to provide various UE services and/or functions, to implement (Quality of Service) QoS on packet flows and to provide connectivity for UEs to external data packet networks. The MME is the primary control element for the EPC. Among other things, the MME may provide for UE tracking and paging procedures including, for example, retransmissions, tracking area list management, idle mode UE tracking, etc. The MME may further provide for UE bearer procedures including activation, deactivation and modification; SGW and PGW selection for UE and authentication services. The SGW is a data plane element that can manage user mobility and interfaces with RANs. The SGW also maintains data paths between HeNBs, eNodeBs and the PGW. The PGW provides connectivity for UEs to external packet data networks, such as, for example an internet or other similar network.

Before detailing some of the operational aspects of FIG. 1, it is important to understand common characteristics of HeNBs and HeNB-GWs as they generally operate in commercial architectures. The following foundation is offered earnestly for teaching purposes only and, therefore should not be construed in any way to limit the broad teachings of the present disclosure. In many network architectures, HeNBs can be deployed as autonomous units to improve reception in areas with poor coverage, or within buildings where coverage is reduced by the structure itself.

Essentially, HeNBs are fully featured base stations that can provide proximate coverage in a business (e.g., enterprise) and/or residential environment. Typically, HeNBs operate at lower radio power levels as compared to macro RANs including eNodeBs, etc. HeNBs can be connected using a standard broadband digital subscriber line (DSL), internet, service network and/or cable service into a service provider's core network. Calls can be made and received, where the signals are sent (potentially encrypted) from the HeNB via the broadband IP network to one of the service provider's main switching centers. HeNBs can be provisioned to readily handle 8, 16, 32, etc. concurrent calls. Thus, HeNBs generally operates as a mini tower for a proximate user. As used herein in this Specification, the terms 'user' and 'subscriber' may be used interchangeably.

In order to scale deployments of HeNBs, the LTE architecture beneficially includes the HeNB-GW element. A HeNB-GW enables all HeNBs parented to the gateway to be represented as a single eNB to the remainder of the LTE EPS. In effect, the HeNB-GW presents an aggregate of all of the HeNBs connected to the gateway to the LTE EPS (e.g., the MME). In some instances, the number of TAIs assigned to the HeNBs connected to a HeNB-GW may necessitate the connected HeNBs to be presented to the remainder of the LTE EPS as multiple eNBs.

HeNB-GW redundancy is increasingly being demanded by network service providers to provide robust small cell network coverage. However, the HeNB/HeNB-GW architecture creates issues for supporting redundancy configurations, since for inbound mobility events, an MME will route packets based on TAI for a UE. Hosting a common TAI on multiple HeNB-GWs will therefore cause ambiguity in terms of being able to support inbound mobility events when a TAI is shared by a plurality of HeNB-GWs (e.g., active plus standby).

In accordance with one embodiment, communication system 10 can overcome the aforementioned shortcomings (and others) by providing a system that enables HeNB-GW redundancy while avoiding MME TAI routing issues. The solution provided by communication system 10 may allow for active (A) and standby (S) SeGWs 24, 26 and HeNB-GWs 28, 30 to be defined for small cells (e.g., HeNBs 20, 22) within the system. Note the term 'active plus standby' may be referred to herein in this Specification as (A+S). Multiple A+S SeGWs 24, 26 and HeNB-GWs 28, 30 may be configured by a network service provider using RMS 32. Using TR-069/TR-196v2 with extensions to A+S definitions, a network service provider, via RMS 32, may provide HeNBs 20, 22 with the multiple A+S SeGW and HeNB-GW definitions as configured for SeGWs 24, 26 and HeNB-GWs 28, 30. The A+S configurations may be associated with different Tracking Area Codes (TACs) or TAIs, which may also be configured using TR-069/TR-196v2 with A+S extensions. Note a TAI, as defined by 3GPP, may include a TAC combined with a Public Land Mobile Network (PLMN) identifier. Thus, as referred to herein in this Specification, configuring TACs for an HeNB may be inclusive of configuring TAIs for the HeNB.

For a deployment including the HeNB-GW redundancy scheme as provided by communication system 10, each primary (active) TAI in the system may have one or more corresponding dormant secondary (backup) TAIs associated with it (e.g., TAI#1 to TAI#n). This could result in doubling, tripling, etc. the number of TAIs defined across the system. Each HeNB 20, 22 may, via TAI databases 36a, 36b, respectively be configured with a primary TAI and one or more backup or secondary TAIs. In parallel, MME 42, via TAI list database 38, may be configured to support a static TAI list comprising the plurality of TACs/TAIs configured for HeNBs 20, 22 as well as any eNBs (e.g., eNB 40) that may have a coverage overlapping, at least in part, coverage areas provided by HeNBs 20, 22. Any UE (e.g., UE 12a, 12b) under the coverage of HeNBs 20, 22 and/or eNB 40 may be provided the TAI list by MME 42 upon establishing a connection with HeNBs 20, 22 and/or eNB 40.

Each HeNB 20, 22 may be configured to parent (e.g., register) to a corresponding active SeGW 24, 26 and a corresponding active HeNB-GW 28, 30. For example, SeGW 24/HeNB-GW 28 may be configured via RMS 32 as an active parent for HeNB 20 and SeGW 26/HeNB-GW 30 may configured as a standby parent; while SeGW 26/HeNB-GW 30 may be configured as an active parent for HeNB 22 and SeGW 24/HeNB-GW 28 may be configured as a standby parent. It should be understood that this active/standby configuration is provided for illustrative purposes only and is not meant to limit the scope of the present disclosure. Any active/standby configuration could be defined for HeNBs 20, 22.

Additionally, each HeNB 20, 22 can respectively perform Internet Protocol Security (IPsec) set-ups with SeGWs 24, 26, depending on a configuration provided via RMS 32. IPsec can use cryptographic security services to protect communications over Internet Protocol (IP) networks. For example, communications over service network 50 between HeNBs 20, 22, SeGWs 24, 26, HeNB-GWs 28, 30, SGW 44, PGW 46, etc. IPsec can support network-level peer authentication, data origin authentication, data integrity, data confidentiality (encryption), and replay protection. Implementation of IPsec can be based on Internet Engineering Task Force (IETF) standards. Based on a configuration provided by RMS 32, SeGWs 24, 26 can perform authentication and obtain an assigned IPsec address for HeNBs 20, 22 from an IP assignment server (not shown), which could be a separate dynamic host configuration protocol (DHCP) server, a local service on SeGWs 24, 26, another IP assignment entity, etc.

HeNBs 20, 22 may be defined to use 'keep-alive' techniques to determine whether to switch from an active to standby SeGW/HeNB-GW in case connectivity to a corresponding parent is lost. In one or more embodiments, keep alive techniques can include IPSec Dead Peer Detection to an SeGW and/or Stream Control Transmission Protocol (SCTP) heartbeat to an HeNB-GW. During operation, if connectivity is lost with a parent (e.g., a HeNB-GW failover), a given HeNB may switch from an active to standby HeNB-GW using HeNB-GW failover techniques as described herein. When switching from an active to standby HeNB-GW, the TAC/TAI broadcast by a HeNB may be updated to reflect a standby TAC/TAI configured for the HeNB and the HeNB may re-parent to one of its standby HeNB-GWs (e.g., HeNBs may have multiple standby definitions) based on a backup configuration provided by RMS 32.

Typically, in the case of a HeNB changing its TAI, all UEs registered against the TAI would perform a tracking area update (TAU). However, this can be avoided using the solution provided by communication system 10 by configuring MME 42 with a TAI list (via TAI list database 38), which may ensure that each primary/secondary TAI configured for each HeNB in the system may be included in a TAI list assigned to a UE upon the UE attaching to an HeNB/eNB provided in the system. Thus, a TAU may not be required for UEs under the coverage of an HeNB that fails over to a standby HeNB-GW and TAUs may not be increased for the system.

Additionally, when operating on its active HeNB-GW and when MME 42 receives a mobility event for a given UE (connected or idle mode), MME 42 may use its TAI routing procedures to signal both the active HeNB-GW and any standby HeNB-GW serving a corresponding HeNB that may be broadcasting a TAI included in the UEs TAI list. Any standby HENB-GW(s) not serving a corresponding HeNB broadcasting a TAI include in the UEs TAI list may be operable to discard any MME signaling.

Consider an example, in which HeNB 20, via TAI database 36a, has been configured with a primary TAI#1 and a backup TAI#2 and HeNB 22, via TAI database 34b, has been configured with a primary TAI#2 and a backup TAI#1. Further assume that MME 42 has been configured, via TAI list database 38, with a TAI list for a given UE (e.g. UE 12a) attached to HeNB 20 that corresponds to the list TAI#1 to TAI#2. Further assume that HeNB 20 may be parented to HeNB-GW 28 and may broadcast primary TAI#1 while HeNB 22 may be may be parented to HeNB-GW 30 and may broadcast a primary TAI#2 (equivalent to the backup TAI#2 for HeNB 20).

In this example on a failover of HeNB-GW 28, HeNB 20, using failover management module 34a, may re-parent to HENB-GW 30 and may switch its broadcast from TAI#1 to TAI#2. Upon receiving a mobility event for UE 12a, MME 42 may signal both HeNB-GW 28 and HeNB-GW 30, which may be associated with both TAI#1 and TAI#2 contained in the TAI list for UE 12a (e.g., MME 42 may have a stored association for HeNB-GW 28 serving TAI#1 and HeNB-GW 30 serving TAI#2 prior to the failover). HeNB-GW 30 serving TAI#2 may be able to respond to the MME signaling based on a response from UE 12a via HeNB 20. Furthermore, since TAI#2 may be pre-configured in the TAI list for UE 12a, the re-parenting and broadcasting of the new TAI (backup TAI#2) by HeNB 20 will not create a flood of TAU procedures from UE 12a or any other UE in coverage of the HeNB 20.

The present example illustrates another feature of the solution provided by communication system 10. In particular, a scheme can be defined where existing primary (active) TAIs for some HeNBs TAI may be defined as secondary (backup) TAIs for other HeNBs in the system (e.g., TAI#2 configured as a backup TAI for HeNB 20 and configured as a primary TAI for HeNB 22), however, this may change the paging profile of the TAI in question in the case of a HeNB-GW failure as new HeNBs could join the TAI. For example, if multiple HeNBs move to an active TAI then, whenever existing UEs or new UEs registered to the TAI or TAI list are paged, there may now be more paging events because more HeNBs are registered to the TAI.

Thus, the solution provided by communication system 10 may provide a mechanism to support HeNB-GW redundancy. Additionally, the solution may not increase TAU traffic for the system, as each UE that may attach to the system via a HeNB or eNB may receive a TAI list including each TAI configured for each HeNB and eNB provided in the system.

In various embodiments, UE 12a-12b can be associated with users, employees, clients, customers, etc. wishing to initiate a flow in communication system 10 via some network. The terms 'user equipment,' 'mobile node,' 'end user,' 'user,' and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 10. UE 12a-12b may also be inclusive of a suitable interface to a human user such as a microphone, a display, a keyboard, or other terminal equipment.

UE 12a-12b may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-12b may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

HeNBs 20, 22 can offer suitable connectivity to one or more UE 12a-12b using any appropriate protocol or technique. In general terms, HeNBs 20, 22 represents a radio access point device that can allow UEs to connect to a wired network using Wi-Fi, Bluetooth™ WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a given UE 12a-12b. In certain cases, the access point can connect to a router (via a wired network), which can relay data between UE 12a, UE 12b and other UEs of the network.

Figure 2:
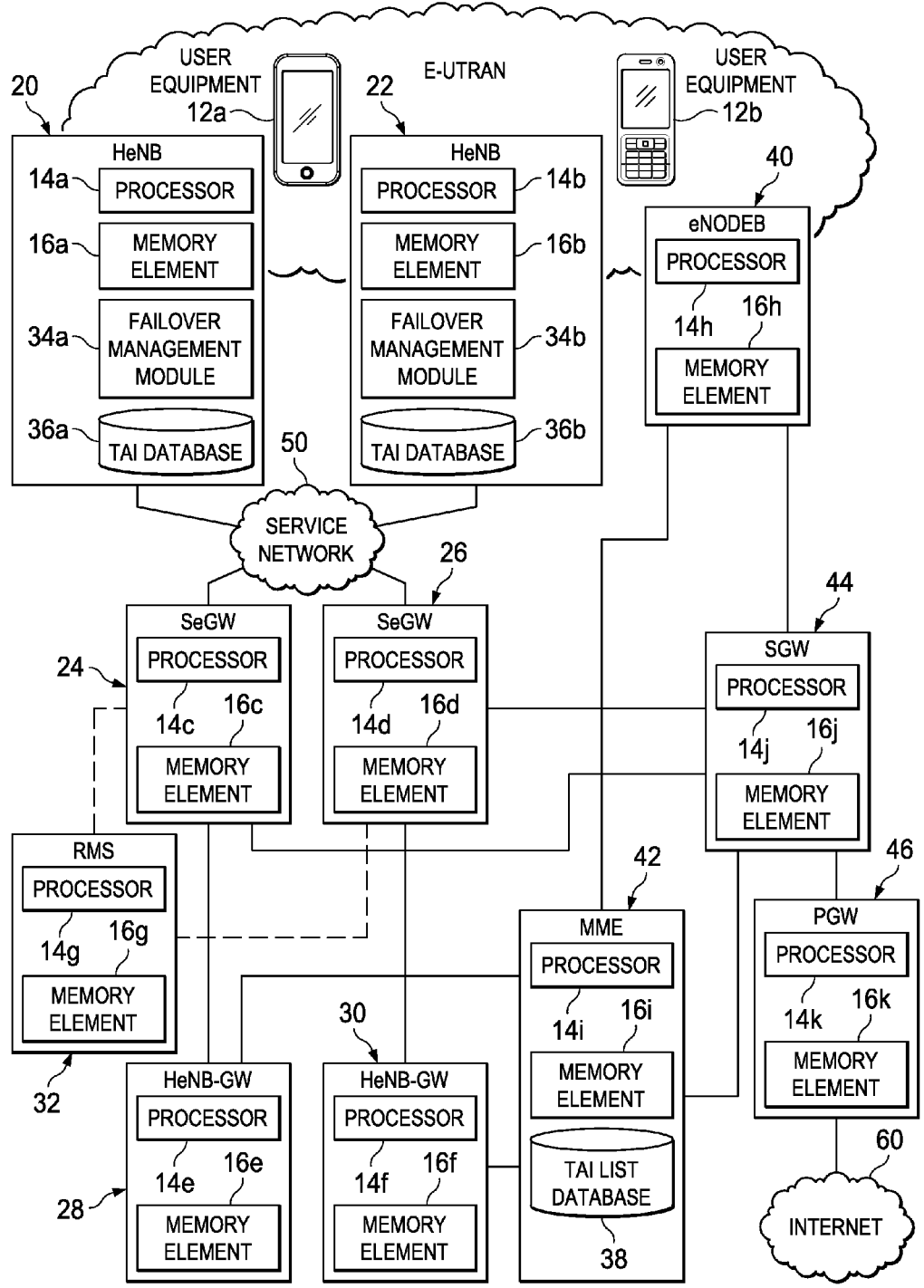
FIG. 2 is a simplified block diagram illustrating example details associated with one potential embodiment of the communication system.

Turning to FIG. 2, FIG. 2 is a simplified block diagram illustrating additional details associated with one potential embodiment of communication system 10. FIG. 2 includes HeNBs 20, 22; SeGWs 24, 26; HeNB-GWs 28, 30; RMS 32, eNodeB 40, MME 42, SGW 44 and PGW 46 of communication system 10. Each of these elements includes a respective processor 14a-14k and a respective memory element 16a-16k. HeNBs 20, 22 may each additionally include a respective failover management module 34a-34b and a respective TAI database 36a-36b. MME 42 may additionally include TAI list database 38. Hence, appropriate software and/or hardware is being provisioned in HeNBs 20, 22; SeGWs 24, 26; HeNB-GWs 28, 30; RMS 32, eNodeB 40, MME 42, SGW 44 and PGW 46 in order to facilitate providing HeNB-GW redundancy in the network environment of communication system 10. Note that in certain examples, certain databases (e.g., for storing TAI information, TAI lists, combinations thereof or the like) can be consolidated with memory elements (or vice versa), or the storage can overlap/exist in any other suitable manner. UE 12a-12b, service network 50 and internet 60 are also shown in FIG. 2.

In one example implementation, HeNBs 20, 22; SeGWs 24, 26; HeNB-GWs 28, 30; RMS 32, eNodeB 40, MME 42, SGW 44 and PGW 46 are network elements, which are meant to encompass network appliances, servers, routers, switches, gateways, bridges, load balancers, firewalls, processors, modules, or any other suitable device, component, element, or object operable to exchange information that facilitates or otherwise helps to provide HeNB-GW redundancy (e.g., for networks such as those illustrated in FIG. 2). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of HeNBs 20, 22; SeGWs 24, 26; HeNB-GWs 28, 30; RMS 32, eNodeB 40, MME 42, SGW 44 and PGW 46 can include memory elements for storing information to be used in achieving the HeNB-GW redundancy operations, as outlined herein. Additionally, each of these devices may include a processor that can execute software or an algorithm to perform the HeNB-GW failover activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to HeNBs 20, 22; SeGWs 24, 26; HeNB-GWs 28, 30; RMS 32, eNodeB 40, MME 42, SGW 44 and PGW 46 could be provided in any database, register, control list, cache, or storage structure: all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and user equipment (e.g., mobile nodes) can also include suitable interfaces for receiving, transmitting, and/or otherwise communicating data or information in a network environment.

Note that in certain example implementations, the HeNB-GW redundancy and/or failover mechanisms/functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Turning to FIG. 3A, FIG. 3A is a simplified block diagram illustrating details associated with an example failover use case 300A for communication system 10 in which a connection failure may occur between HeNB 20 and SeGW 24/HeNB-GW 28. FIG. 3A includes UEs 12*a*, 12*b*; HeNBs 20, 22 and an additional HeNB 70; SeGWs 24, 26; HeNB-GWs 28, 30 and MME 42. As shown in FIG. 3A, UE 12*a* may be in communication with HeNB 20 and UE 12*b* may be in communication with HeNB 70. For use case 300A, HeNB 20 may be configured with a primary TAI 1 and a backup TAI 2 and may be configured to parent to SeGW 24/HeNB-GW 28 for its primary TAI 1 and to SeGW 26/HeNB-GW 30 for its backup TAI 2. HeNB 22 may be configured with a primary TAI 1 and a backup TAI 2 and may be also be configured to parent to SeGW 24/HeNB-GW 28 for its primary TAI 1 and to SeGW 26/HeNB-GW 30 for its backup TAI 2. HeNB 70 may be configured with a primary TAI 2 and a backup TAI 1 and may be configured to parent to SeGW 26/HeNB-GW 30 for its primary TAI 2 and to SeGW 24/HeNB-GW 28 for its backup TAI 1. Connections between HeNBs 20, 22 and 70 are assumed to pass through service network 50, as shown in FIG. 1, however, service network 50 is not shown in FIG. 3A in order to illustrate other features of the system.

MME 42 may maintain an HeNB-GW IP address table for each TAI served by each HeNB-GW within the system. For example, each HeNB-GW 28, 30 may be assigned an eNB ID with a HeNB-GW flag set for each ID as MME 42 may not otherwise distinguish between HeNBs and eNBs within the system. As shown in FIG. 3A, the pre-failure HeNB-GW IP address table for MME 42 may include eNB ID AA for TAI 1 being set to IP address A for HeNB-GW 28 (e.g., serving eNB ID A (HeNB 20) and eNB ID B (HeNB 22) configured to broadcast primary TAI 1 pre-failure) and eNB ID BB for TAI 2 being set to IP address B for HeNB-GW 30 (e.g., serving eNB ID C (HeNB 70) configured to broadcast primary TAI 2 pre-failure).

MME 42 may further include a TAI list configured for each of UE 12*a* and UE 12*b*. As UE 12*a* may be in communication with HeNB 20, its TAI list and the TAI list for UE 12*a* maintained in MME 42 (e.g., via TAI list database 38 as shown in FIG. 1) may include TAIs 1 and 2. As UE 12*b* may be in communication with HeNB 22, its TAI list and the TAI list for UE 12*b* maintained in MME 42 may include TAIs 2 and 1. As shown in FIG. 3A, the TAI lists for each UE 12*a*-12*b* may be ordered beginning with primary TAI followed by one or more backup TAIs, however, it should be understood that any ordering of TAIs in the TAI lists for UE 12*a*-12*b* and for MME 42 is within the scope of the present disclosure; the TAI orders are provided for illustrative purposes only.

As shown in FIG. 3A, a connection failure may occur between HeNB 20 and SeGW 24/HeNB-GW 28, while the connection between HeNB 22 and SeGW 24/HeNB-GW 28 may be maintained. Following the connection failure, HeNB 20 may re-parent to its backup gateways, SeGW 26/HeNB-GW 30, and may switch its broadcast TAI from TAI 1 to TAI 2 (previously its backup/stand-by TAI, but now its active TAI). As UE 12*a* may include a TAI list including TAI 1 and TAI 2, the failover connection of HeNB 20 to SeGW 26/HeNB-GW 30 and TAI switching performed by HeNB 20 may not cause UE 12*a* to issue a TAU. Thus, HeNB-GW redundancy may be provided for the system and TAUs may not be increased for UEs under the coverage of HeNB 20.

Figure 3B:
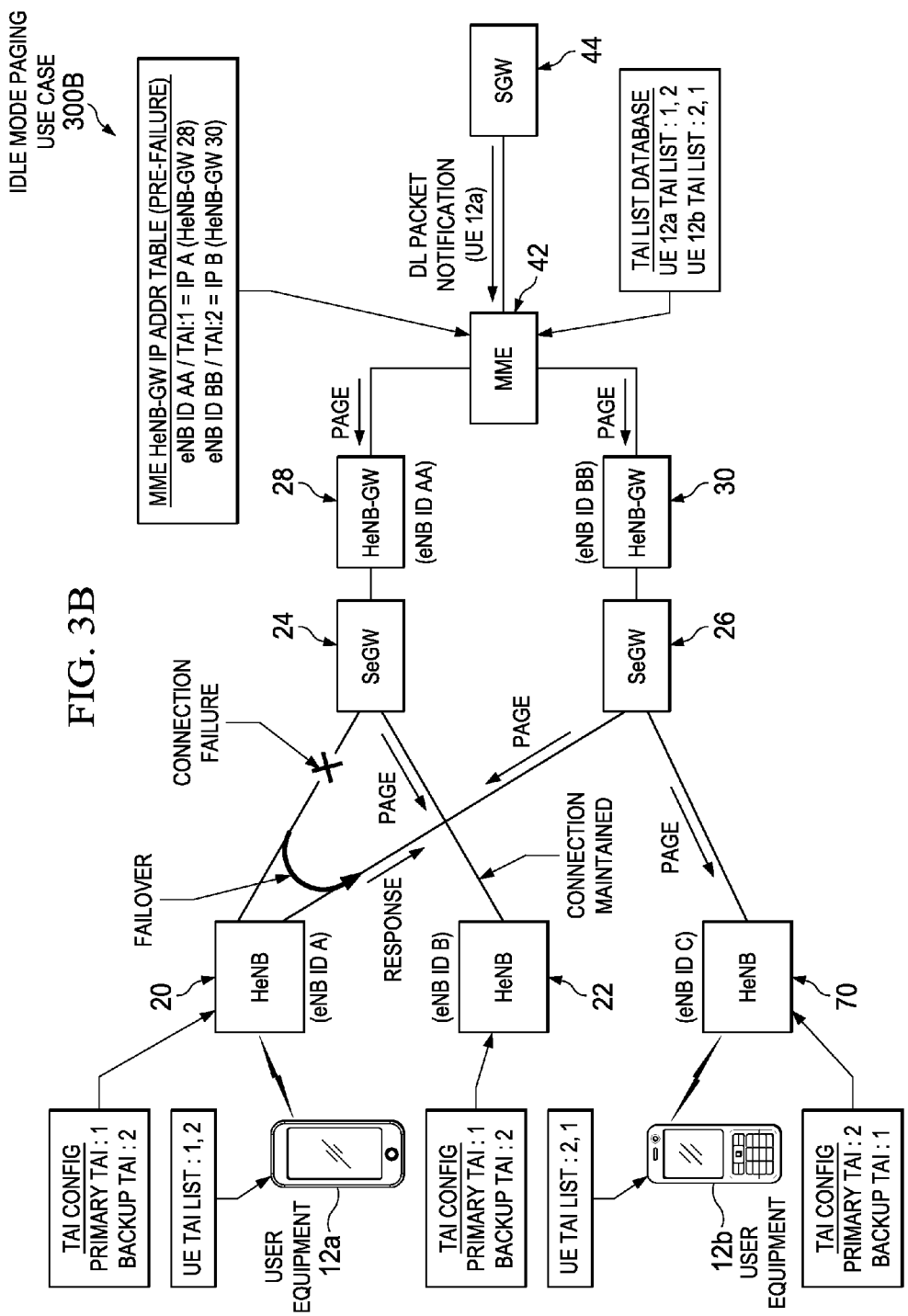
FIG. 3B is a simplified block diagram illustrating other details associated with another example use case in a particular implementation of the communication system.

Turning to FIG. 3B, FIG. 3B is a simplified block diagram illustrating details associated with an example idle mode paging use case 300B for communication system 10 for the failover between HeNB 20 and SeGW 24/HeNB-GW 28 as shown in FIG. 3A. FIG. 3B may include all of the elements and configurations (e.g., failover to backup SeGW 26/HeNB-GW 30) as described for FIG. 3A and may additionally include SGW 44. For use case 300B shown in FIG. 3B, SGW 44 may, for example, issue a downlink (DL) packet notification to UE 12*a* (e.g., a call may be placed to UE 12*a*). Using its HeNB-GW IP address table, MME 42 may forward the page to HeNB-GW 28 and HeNB-GW 30, each of which may serve a TAI included in the TAI list for UE 12*a* (e.g., TAI 1 and TAI 2). The page may be forward MME 42 to HeNBs 20, 22 and 70. A response to the page may be returned to MME 42 from HeNB 20 via SeGW 26 and HeNB-GW 30 through which the backup connection has been established.

Figure 4A:
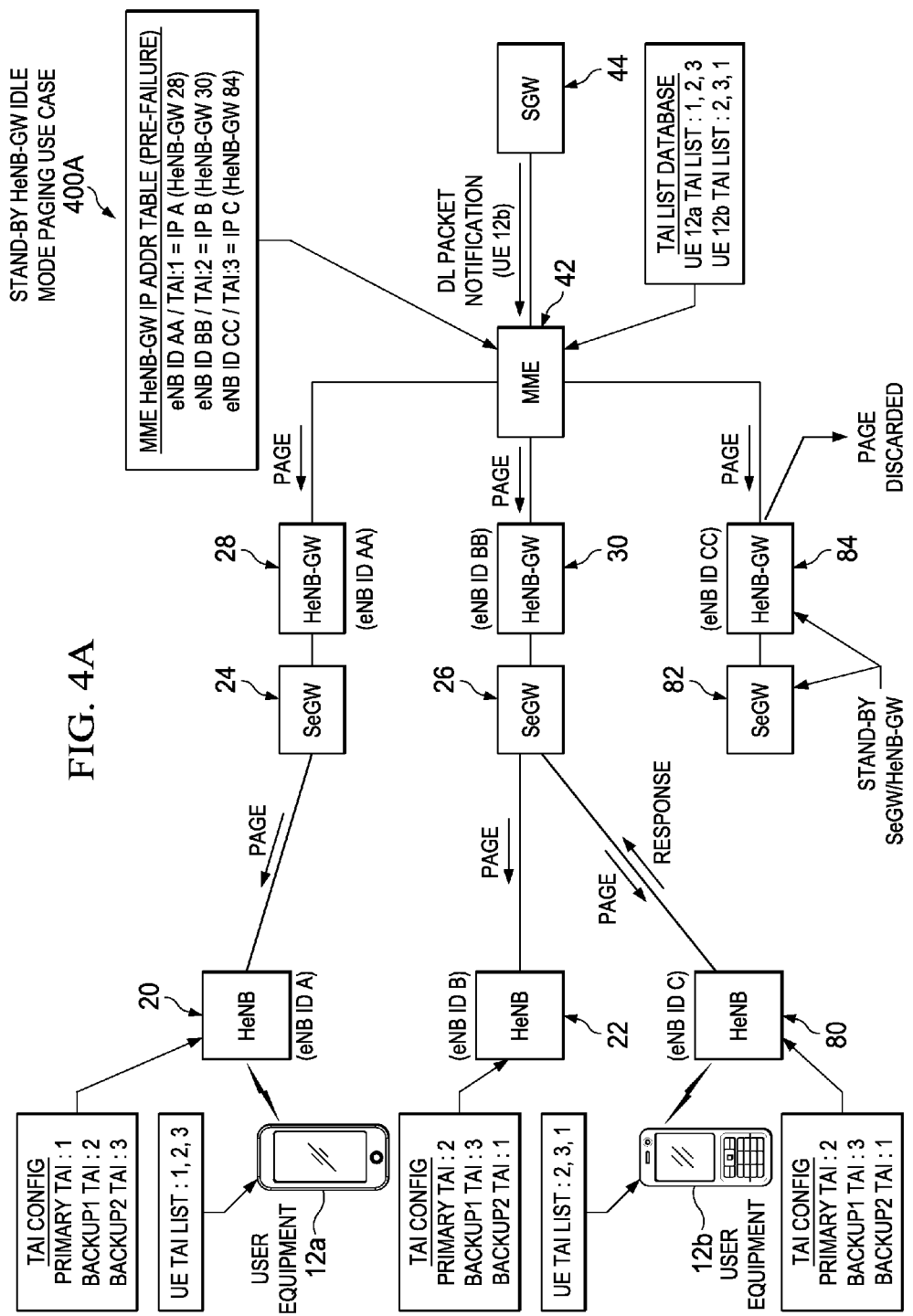
FIG. 4A is a simplified block diagram illustrating other details associated with another example use case in a particular implementation of the communication system.

Turning to FIG. 4A, FIG. 4A is a simplified block diagram illustrating details associated with an example idle mode paging use case 400A for communication system 10 involving a stand-by SeGW 82 and stand-by HeNB-GW 84. FIG. 4A includes UEs 12*a*, 12*b*; HeNBs 20, 22 and an additional HeNB 80; SeGWs 24, 26, 82; HeNB-GWs 28, 30, 84; MME 42 and SGW 44. As shown in FIG. 4A, UE 12*a* may be in communication with HeNB 20 and UE 12*b* may be in communication with HeNB 80.

For use case 400A, HeNB 20 may be configured with a primary TAI 1, a first backup TAI 2 and a second backup TAI 3 and may be configured to parent to SeGW 24/HeNB-GW 28 for its primary TAI 1, to parent to SeGW 26/HeNB-GW 30 for its first backup TAI 2 and to parent to SeGW 82/HeNB-GW 84 for its second backup TAI 3. HeNB 22 may be configured with a primary TAI 2, a first backup TAI 3 and a second backup TAI 1 and may be configured to parent to SeGW 26/HeNB-GW 30 for its primary TAI 2, to parent to SeGW 82/HeNB-GW 84 for its first backup TAI 3 and to parent to SeGW 24/HeNB-GW 28 for its second backup TAI 1. HeNB 80 may also be configured with a primary TAI 2, a first backup TAI 3 and a second backup TAI 1 and may be configured to parent to SeGW 26/HeNB-GW 30 for its primary TAI 2, to parent to SeGW 82/HeNB-GW 84 for its first backup TAI 3 and to parent to SeGW 24/HeNB-GW 28 for its second backup TAI 1. Connections between HeNBs 20, 22 and 80 are assumed to pass through service network 50, as shown in FIG. 1, however, service network 50 is not shown in FIG. 4A in order to illustrate other features of the system.

MME 42 may maintain an HeNB-GW IP address table for each TAI served by each HeNB-GW within the system. For example, each HeNB-GW 28, 30, 84 may be assigned an eNB ID with an HeNB-GW flag set for each ID as MME 42 may not otherwise distinguish between HeNBs and eNBs within the system. As shown in FIG. 4A, the pre-failure HeNB-GW IP address table for MME 42 may include eNB ID AA for TAI 1 being set to IP address A for HeNB-GW 28 (e.g., serving eNB ID A (HeNB 20) configured to broadcast primary TAI 1 pre-failure), eNB ID BB for TAI 2 being set to IP address B for HeNB-GW 30 (e.g., serving eNB ID B (HeNB 22) and eNB ID C (HeNB 80), each configured to broadcast primary TAI 2 pre-failure) and eNB ID CC for TAI 3 being set to IP address C for HeNB-GW 84, configured as a stand-by HeNB-GW to serve a backup TAI 3.

MME 42 may further include a TAI list configured for each of UE 12a and UE 12b. As UE 12a may be in communication with HeNB 20, its TAI list and the TAI list for UE 12a maintained in MME 42 (e.g., via TAI list database 38 as shown in FIG. 1) may include TAIs 1, 2 and 3. As UE 12b may be in communication with HeNB 80, its TAI list and the TAI list for UE 12b maintained in MME 42 may include TAIs 2, 3 and 1. As shown in FIG. 4A, the TAI lists for each UE 12a-12b may be ordered beginning with primary TAI followed by one or more backup TAIs, however, it should be understood that any ordering of TAIs in the TAI lists for UE 12a-12b and for MME 42 is within the scope of the present disclosure; the TAI orders are provided for illustrative purposes only.

No connection failure is shown in FIG. 4A. Rather, for use case 400A, SGW 44 may, for example, issue a DL packet notification to UE 12b (e.g., a call may be placed to UE 12b). Using its HeNB-GW IP address table, MME 42 may forward the page to HeNB-GW 28, HeNB-GW 30 and HeNB-GW 84, each of which may be configured to serve a TAI included in the TAI list for UE 12b (e.g., TAI 2, 3 and 1). The page may be received by each of HeNB-GWs 28, 30 and 84. As HeNB-GW 28 may be in communication (e.g., connected) to HeNB 20 broadcasting primary TAI 1, included in the TAI list for UE 12b, HeNB-GW 28 may forward the page to HeNB 20 via SeGW 24. As HeNB-GW 30 may be in communication (e.g., connected) to HeNB 22 and HeNB 80 broadcasting primary TAI 2, also included in the TAI list for UE 12b, HeNB-GW 30 may forward the page to HeNB 22 and HeNB 80 via SeGW 26. A response to the page may be returned to MME 42 from HeNB 80 via SeGW 26 and HeNB-GW 30.

As shown in FIG. 4A, stand-by HeNB-GW 84 may not presently be in communication with a HeNB in the system. As such, HeNB-GW 84 may discard the page. Accordingly, FIG. 4A illustrates that the solution provided by communication system 10 may provide a mechanism for discarding UE pages by stand-by HeNB-GWs within the system, which may not be in communication with one or more HeNBs broadcasting a TAI included in the TAI list for a corresponding UE to which pages may be directed.

Figure 4B:
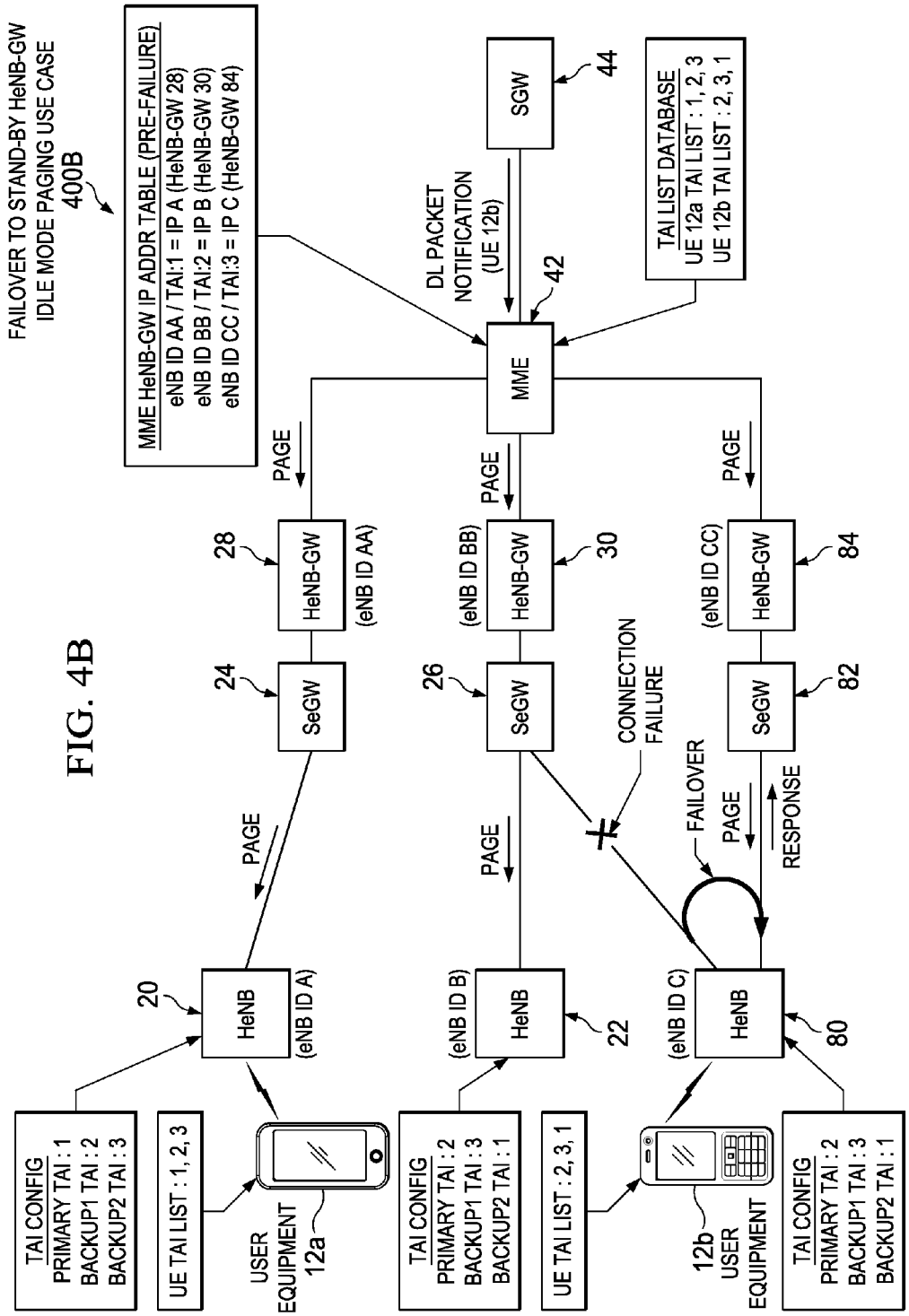
FIG. 4B is a simplified block diagram illustrating other details associated with another example use case in a particular implementation of the communication system.

Turning to FIG. 4B, FIG. 4B is a simplified block diagram illustrating details associated with another idle mode paging use case 400B in which a connection failure may occur between HeNB 80 and SeGW 26/HeNB-GW 30 shown in FIG. 4A. FIG. 4B may include all of the elements and configurations as described for FIG. 4A. As shown in use case 400B, a connection failure may occur between HeNB 80 and SeGW 26/HeNB-GW 30, while the connection between HeNB 22 and SeGW 26/HeNB-GW 30 may be maintained. Following the connection failure, HeNB 80 may failover and re-parent to its configured first backup gateways, stand-by SeGW 82 and HeNB-GW 84, and may switch its broadcast TAI from TAI 2 to TAI 3. As UE 12b may include a TAI list including TAI 2 and TAI 3, the failover connection of HeNB 80 to SeGW 82/HeNB-GW 84 TAI switching performed by HeNB 80 may not cause UE 12b to issue a TAU. Thus, HeNB-GW redundancy may be provided for the system and TAUs may not be increased for UEs under the coverage of HeNB 80.

Further assume, for example, that SGW 44 may issue a DL packet notification to UE 12b (e.g., a call may be placed to UE 12b). Using its HeNB-GW IP address table, MME 42 may forward the page to HeNB-GW 28, HeNB-GW 30 and HeNB-GW 84, each of which may be configured to serve a TAI included in the TAI list for UE 12b (e.g., TAI 2, 3 and 1). The page may be received by each of HeNB-GWs 28, 30 and 84. As HeNB-GW 28 may be in communication (e.g., connected) to HeNB 20 broadcasting primary TAI 1, included in the TAI list for UE 12b, HeNB-GW 28 may forward the page to HeNB 20 via SeGW 24. As HeNB-GW 30 may be in communication (e.g., connected) to HeNB 22 broadcasting primary TAI 2, also included in the TAI list for UE 12b, HeNB-GW 30 may forward the page to HeNB 22 via SeGW 26.

In contrast to FIG. 4A, HeNB-GW 84, as shown in FIG. 4B, may now be active and in communication with (e.g., connected to) HeNB 80, which may be broadcasting its first backup TAI 3 following the connection failure between HeNB 80 and SeGW 26/HeNB-GW 30. Thus, rather than discard the page, HeNB-GW 84 may now forward the page to HeNB 80 via SeGW 82. A response to the page may be returned to MME 42 from HeNB 80 via SeGW 82 and HeNB-GW 84.

Turning to FIG. 5, FIG. 5 is a simplified flow diagram 500 illustrating example operations associated with providing small cell gateway redundancy in a network environment in one example operation of communication system 10. In one particular embodiment, these operations may involve HeNBs 20, 22; SeGWs 24, 26, HeNB-GWs 28, 30; RMS 32 and MME 42 as shown in FIG. 1. Processing may start at 510 when a given HeNB (e.g., HeNB 20 or HeNB 22) may be configured via RMS 32 with a plurality of TAIs. [Note configuring TAIs may be inclusive of configuring TACs for the HeNBs, as TAIs are a combination of a TAC and a PLMN for a HeNB.] The plurality of TAIs may include a primary TAI and one or more backup or secondary TAIs. At 520, a TAI list may be configured for MME 42 corresponding to the plurality of TAIs configured for the HeNB. At 530, the HeNB may begin broadcasting a first TAI. In an embodiment, the first TAI may be the primary TAI configured for the HeNB.

At 540, the HeNB may determine if a connection failure has occurred with a first HeNB-GW (e.g., HeNB-GW 28 or HeNB-GW 30, depending on configuration) to which the HeNB is parented. If no connection failure has occurred, the HeNB may continue to broadcast its first TAI at 530. However, if a connection failure has occurred, the HeNB may re-parent to a second HeNB-GW at 550. The second HeNB-GW may be determined using a backup TAI configuration configured for the HeNB. At 560, the HeNB may switch from broadcasting the first TAI to broadcasting a second TAI (e.g., one of the one or more backup TAIs configured for the HeNB).

Turning to FIG. 6, FIG. 6 is a simplified flow diagram 600 illustrating other example operations associated with providing small cell gateway redundancy in a network environment in one example operation of communication system 10. In one particular embodiment, these operations may involve HeNBs 20, 22; SeGWs 24, 26, HeNB-GWs 28, 30; RMS 32 and MME 42 as shown in FIG. 1.

Processing may start at 610 when a given HeNB (e.g., HeNB 20 or HeNB 22) may be configured via RMS 32 with a plurality of TAIs. [Note configuring TAIs may be inclusive of configuring TACs for the HeNBs, as TAIs are a combination of a TAC and a PLMN for a HeNB.] The plurality of TAIs may include a primary TAI and one or more backup or secondary TAIs. At 620, one or more IPSec addresses may be configured for the HeNB for each of one or more SeGWs (e.g., SeGW 24 and/or SeGW 26) corresponding to each of one or more HeNB-GWs (e.g. HeNB-GW 28 and/or HeNB-GW 30) that may serve each TAI configured for the HeNB. At 630, a TAI list may be configured for MME 42 including the plurality of TAIs configured for the HeNB. At 640, the HeNB may begin broadcasting a first TAI. In an embodiment, the first TAI may be the primary TAI configured for the HeNB. At 642, the TAI list configured for MME 42 may be communicated to a UE (e.g., UE 12a and/or UE 12b) that attaches to the HeNB. In this manner, the TAI list stored by the UE may include each of the TAIs configured for the HeNB; thus the UE may not issue a TAU if the HeNB switches its broadcast TAI from the first TAI to one or more second TAIs.

At 650, the HeNB may determine if a connection failure has occurred with a first HeNB-GW (e.g., HeNB-GW 28 or HeNB-GW 30, depending on configuration) to which the HeNB is parented. If no connection failure has occurred, the HeNB may continue to broadcast its first TAI at 640. However, if a connection failure has occurred, the HeNB may re-parent to a second HeNB-GW at 660. The second (e.g., backup) HeNB-GW may be determined using a backup TAI and corresponding backup SeGW/HeNB-GW configuration configured for the HeNB. At 670, the HeNB may switch from broadcasting the first TAI to broadcasting a second TAI (e.g., one of the one or more backup TAIs configured for the HeNB). Again, at 642 the TAI list configured for MME 42 may continue to be communicated to any UE that may attach to the HeNB.

Turning to FIG. 7, FIG. 7 is a simplified flow diagram 700 illustrating yet other example operations associated with providing small cell gateway redundancy in a network environment in one example operation of communication system 10. In one particular embodiment, these operations may involve HeNBs 20, 22; SeGWs 24, 26, HeNB-GWs 28, 30; RMS 32, eNodeB 40 and MME 42 as shown in FIG. 1.

Processing may start at 710 when a plurality of HeNBs (e.g., HeNBs 20, 22) may each be configured via RMS 32 with a plurality of TAIs. [Note configuring TAIs may be inclusive of configuring TACs for the HeNBs, as TAIs are a combination of a TAC and a PLMN for a HeNB.] The plurality of TAIs configured for each of the HeNBs may include a primary TAI and one or more backup or secondary TAIs. At 720, for each of the plurality of HeNBs, one or more IPSec addresses may be configured for each of one or more SeGWs (e.g., SeGW 24 and/or SeGW 26) corresponding to each of one or more HeNB-GWs (e.g. HeNB-GW 28 and/or HeNB-GW 30) that may serve each TAI configured for each of the plurality of HeNBs.

At 730, a TAI list may be configured for MME 42 including the plurality of TAIs configured for each of the plurality of HeNBs as well as any TAI for any of one or more eNodeBs (e.g., eNodeB 40) that may have a coverage area that may overlap, at least in part, a coverage area provided by each of the plurality of HeNBs. At 740, the TAI list configured for MME 42 may be communicated to any UE (e.g., UE 12a and/or UE 12b) that attaches to any of the plurality of HeNBs or eNodeBs. In this manner, the TAI list stored by the UE may include each of the TAIs configured for the plurality of HeNBs as well as one or more eNodeBs having a coverage area overlapping coverage areas provided by the HeNBs. Thus a given UE under the coverage of a given HeNB may not issue a TAU if the HeNB switches its broadcast TAI from a first TAI to one or more second TAIs.

Turning to FIG. 8, FIG. 8 is a simplified flow diagram 800 illustrating example operations associated with idle mode paging in one example operation of communication system 10. In one particular embodiment, these operations may involve HeNBs 20, 22; SeGWs 24, 26, HeNB-GWs 28, 30; MME 42 and SGW 44 as shown in FIG. 1. Processing may start at 810 when a downlink packet notification may be received by MME 42 for a given UE (e.g., UE 12a or UE 12b). For purposes of the present example operations, it is assumed that MME 42 includes a TAI list configured for UEs 12a and/or 12b (e.g., stored in TAI list database 38, as shown in FIG. 1) as well as an HeNB-GW IP address table for each one or more HeNB-GWs (e.g., HeNB-GWs 28, 30) configured in the system. At 820, MME 42 may initiate a page to each of one or more HeNB-GWs that may be configured to serve a TAI contained in the TAI list for the UE.

At 830, each corresponding HeNB-GW may receive the page. At 840, each HeNB-GW may determine if it has a connection with one or more HeNBs broadcasting a TAI contained in the TAI list for the UE (e.g., the HeNB-GW may determine whether it is in an active mode serving one or more HeNBs broadcasting a corresponding TAI or merely in a stand-by mode not serving one or more HeNBs). If a HeNB-GW determines that it does not have a connection with one or more HeNBs broadcasting a TAI contained in the TAI list for the UE, the HeNB-GW may discard the page at 842. However, if a HeNB-GW determines that it does have a connection with one or more HeNBs broadcasting a TAI contained in the TAI list for the UE, the HeNB-GW may forward the page to the corresponding HeNB(s) at 850 and processing may continue normally for the system.

It is important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    configuring each of a plurality of Home eNode Bs (HeNBs) with a plurality of tracking area identities (TAIs), wherein each TAI is served by one of a plurality of HeNB gateways (HeNB-GWs);
configuring a TAI list for a Mobility Management Entity (MME), wherein the TAI list includes each of the plurality of TAIs;
broadcasting a first TAI by a particular HeNB, wherein the first TAI is served by a first HeNB-GW;
switching the broadcasting from the first TAI to a second TAI served by a second HeNB-GW and re-parenting the particular HeNB from the first HeNB-GW to the second HeNB-GW if the particular HeNB loses connectivity with the first HeNB-GW; and
routing a page to each of the plurality of HeNB-GWs serving each of the plurality of TAIs included in the TAI list, wherein the page is for a particular user equipment (UE) attached to the particular HeNB.

2. The method of claim 1, further comprising:
configuring an Internet Protocol Security (IPSec) address for each of a security gateway (SeGW) corresponding to each of the plurality of HeNB-GWs, wherein each TAI configured for each of the plurality of HeNBs is associated with a particular IPSec address for a particular SeGW and corresponding HeNB-GW.

3. The method of claim 1, further comprising:
communicating the TAI list to the user equipment (UE) when the UE attaches to the particular HeNB.

4. The method of claim 1, further comprising:
configuring the TAI list to include one or more TAIs for one or more corresponding eNode Bs (eNBs); and
communicating the TAI list including the plurality of TAIs for the plurality of HeNBs and the one or more eNBs to a user equipment (UE) when the UE attaches to a particular eNB.

5. The method of claim 1, further comprising:
receiving, by the MME, a downlink packet notification for the particular UE; and
routing the page for the particular UE to each of the plurality of HeNB-GWs serving each of the plurality of TAIs included in the TAI list.

6. The method of claim 5, further comprising:
discarding the page by a particular HeNB-GW if the particular HeNB-GW is not connected to a HeNB broadcasting a TAI included in the TAI list.

7. The method of claim 1, further comprising:
switching the broadcasting from the second TAI to a third TAI served by a third HeNB-GW and re-parenting the particular HeNB from the second HeNB-GW to the third HeNB-GW if the HeNB loses connectivity with the second HeNB-GW.

8. One or more non-transitory tangible media encoding logic that include instructions for execution that, when executed by a processor, is operable to perform operations comprising:
Configuring each of a plurality Home eNode Bs (HeNBs) with a plurality of tracking area identities (TAIs), wherein each TAI is served by one of a plurality of HeNB gateways (HeNB-GWs);
configuring a TAI list for a Mobility Management Entity (MME), wherein the TAI list includes each of the plurality of TAIs;
broadcasting a first TAI by a particular HeNB, wherein the first TAI is served by a first HeNB-GW;
switching the broadcasting from the first TAI to a second TAI served by a second HeNB-GW and re-parenting the particular HeNB from the first HeNB-GW to the second HeNB-GW if the particular HeNB loses connectivity with the first HeNB-GW; and
routing a page to each of the plurality of HeNB-GWs serving each of the plurality of TAIs included in the TAI list, wherein the page is for a particular user equipment (UE) attached to the particular HeNB.

9. The media of claim 8, the operations further comprising:
configuring an Internet Protocol Security (IPSec) address for each of a security gateway (SeGW) corresponding to each of the plurality of HeNB-GWs, wherein each TAI configured for each of the plurality of HeNBs is associated with a particular IPSec address for a particular SeGW and corresponding HeNB-GW.

10. The media of claim 8, the operations further comprising:
communicating the TAI list to the particular UE when the particular UE attaches to the particular HeNB.

11. The media of claim 8, the operations further comprising:
configuring the TAI list to include one or more TAIs for one or more corresponding eNode Bs (eNBs); and
communicating the TAI list including the plurality of TAIs for the plurality of HeNBs and the one or more eNBs to a user equipment (UE) when the UE attaches to a particular eNB.

12. The media of claim 8, the operations further comprising:
receiving, by the MME, a downlink packet notification for the particular UE; and
routing the page for the particular UE to each of the plurality of HeNB-GWs serving each of the plurality of TAIs included in the TAI list.

13. The media of claim 8, the operations further comprising:
switching the broadcasting from the second TAI to a third TAI served by a third HeNB-GW and re-parenting the HeNB from the second HeNB-GW to the third HeNB-GW if the HeNB loses connectivity with the second HeNB-GW.

14. An apparatus, comprising:
a memory element for storing data; and
a processor that executes instructions associated with the data, wherein the processor and memory element cooperate such that the apparatus is configured for:
configuring each of a plurality of Home eNode Bs (HeNBs) with a plurality of tracking area identities (TAIs), wherein each TAI is served by one of a plurality of HeNB gateways (HeNB-GWs);
configuring a TAI list for a Mobility Management Entity (MME), wherein the TAI list includes each of the plurality of TAIs;
broadcasting a first TAI by a particular HeNB, wherein the first TAI is served by a first HeNB-GW;
switching the broadcasting from the first TAI to a second TAI served by a second HeNB-GW and re-parenting the particular HeNB from the first HeNB-GW to the second HeNB-GW if the particular HeNB loses connectivity with the first HeNB-GW; and
routing a page to each of the plurality of HeNB-GWs serving each of the plurality of TAIs included in the TAI list, wherein the page is for a particular user equipment (UE) attached to the particular HeNB.

15. The apparatus of claim 14, the apparatus being further configured for:
configuring an Internet Protocol Security (IPSec) address for each of a security gateway (SeGW) corresponding to each of the plurality of HeNB-GWs, wherein each TAI configured for each of the plurality of HeNBs is associated with a particular IPSec address for a particular SeGW and corresponding HeNB-GW.

16. The apparatus of claim 14, the apparatus being further configured for:
switching the broadcasting from the second TAI to a third TAI served by a third HeNB-GW and re-parenting the particular HeNB from the second HeNB-GW to the third HeNB-GW if the particular HeNB loses connectivity with the second HeNB-GW.

\* \* \* \* \*